July 1, 1924.
H. O. HEM
1,499,776
FAN AND DIAL PENDULUM SCALE
Filed Jan. 26, 1920 4 Sheets-Sheet 2
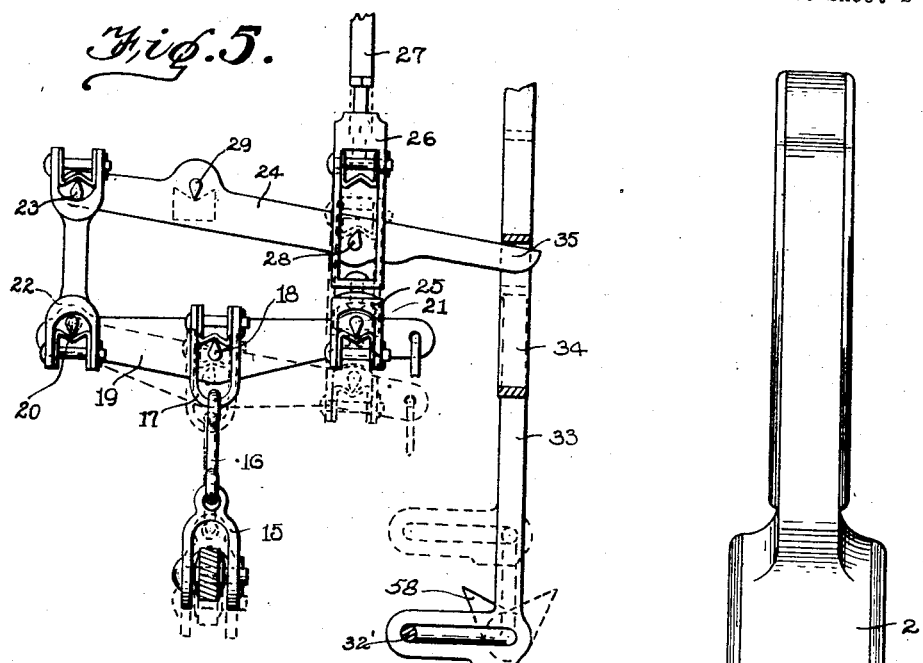
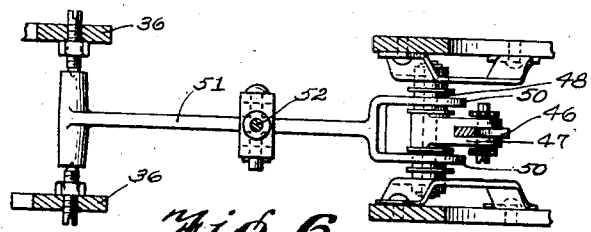
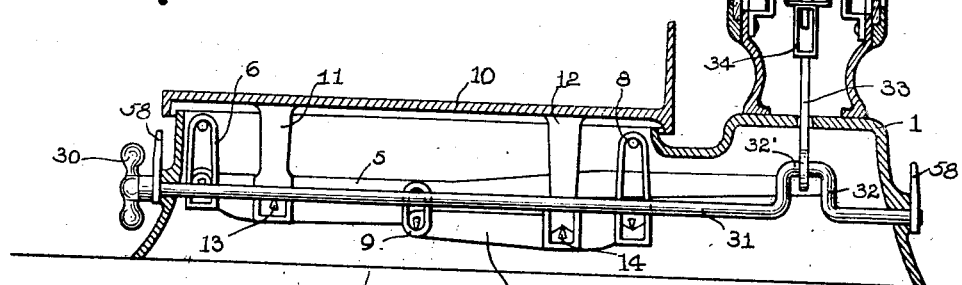
Inventor
Halvor O. Hem,
By George R. Frye
Attorney

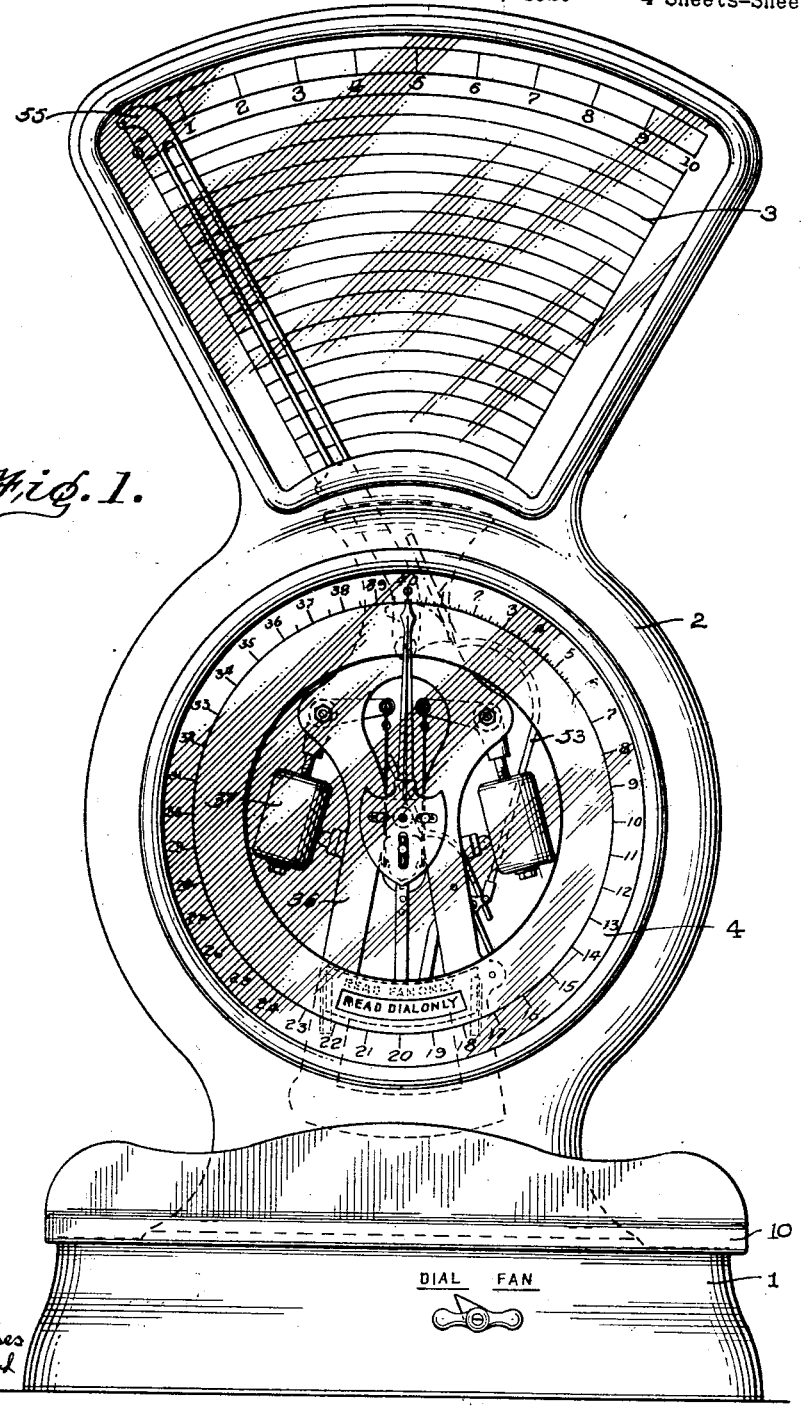

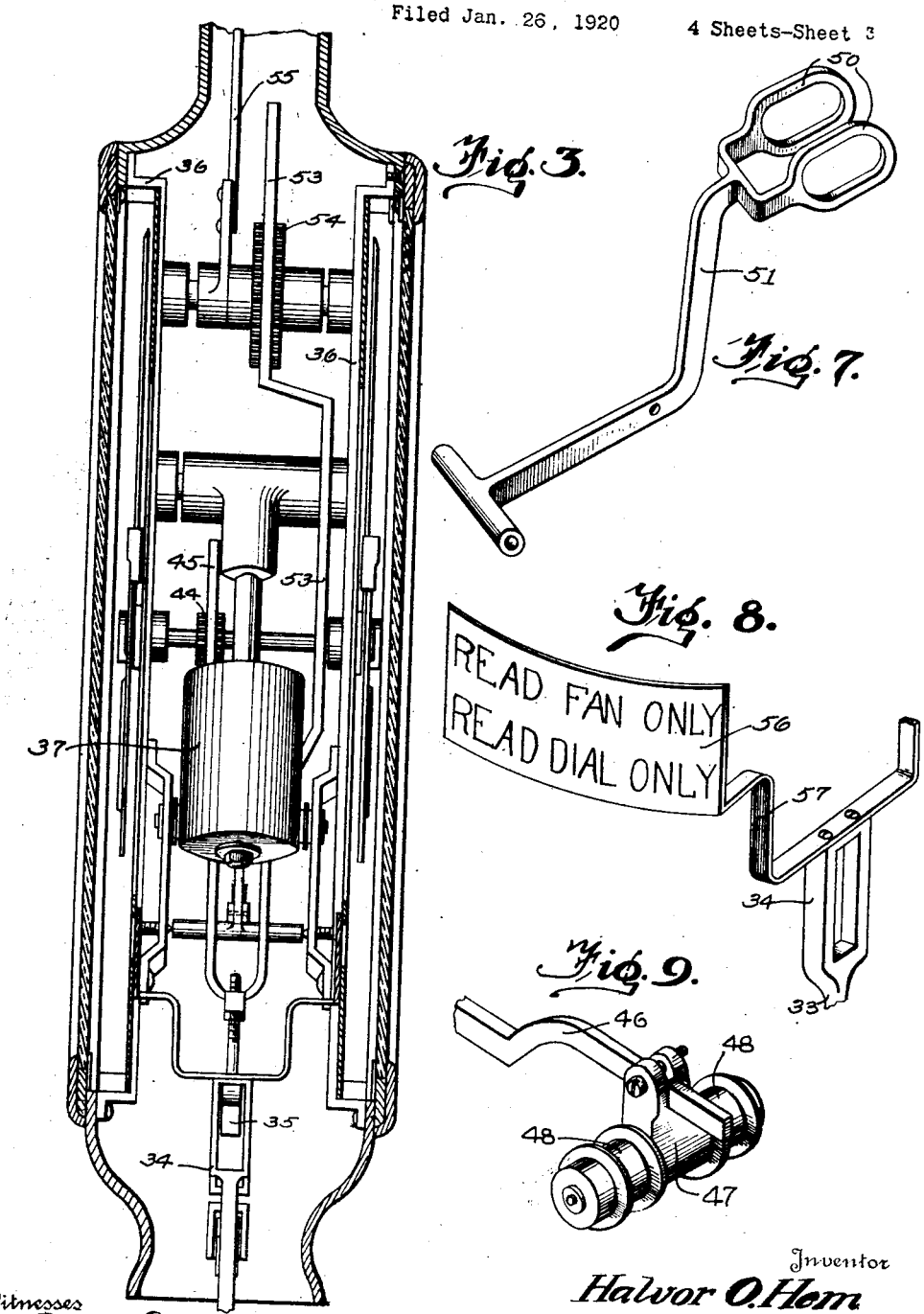

July 1, 1924.

H. O. HEM 1,499,776

FAN AND DIAL PENDULUM SCALE

Filed Jan. 26, 1920.   4 Sheets-Sheet 4

Witnesses

Inventor
Halvor O. Hem,
By George R. Frye
Attorney

Patented July 1, 1924.

1,499,776

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

FAN AND DIAL PENDULUM SCALE.

Application filed January 26, 1920. Serial No. 354,144.

*To all whom it may concern:*

Be it known that I, HALVOR O. HEM, a citizen of the United States, residing at Toledo, in the county of Lucas and State of Ohio, have invented certain new and useful Improvements in Fan and Dial Pendulum Scales, of which the following is a specification.

This invention relates to weighing scales, particularly scales of counter types.

One of its principal objects is the provision of a scale which may be changed at will from a computing scale of great sensitiveness to a non-computing scale of comparatively great capacity.

Another object is the provision of a pendulum scale in which the multiplying levers may all be mounted on knife edge pivots resting in fixed bearings, with the indicating mechanism so related thereto that the weight is indicated on charts having uniform graduations.

Another object is the provision of means for quickly and easily changing the multiplication of the lever mechanism.

With the above and other objects in view which will readily appear as the invention is better understood, my invention consists in the novel construction, combination and arrangement of parts to be hereinafter more fully described and particularly pointed out in the subjoined claims.

Reference is to be had to the accompanying drawings illustrating a preferred embodiment of my invention and wherein similar reference numerals designate similar parts throughout the several views.

In the drawings:—

Figure 1 is a front elevation of a scale embodying my invention;

Figure 2 is a side elevation of the same, partly in section, showing the capacity-changing chart and connections;

Figure 3 is a section through the dials showing the load-offsetting mechanism in elevation;

Figure 5 is a front elevation of parts of the capacity-changing device;

Figure 6 is a plan view of the indicator operating arm, other parts being shown in section;

Figure 7 is a perspective view of the indicator operating arm;

Figure 8 is a perspective view of the flash indication, parts being broken away.

Figure 9 is a perspective view of the rack bar carriage, showing the manner of connecting the indicator rack bar thereto.

Figures 4, 10:
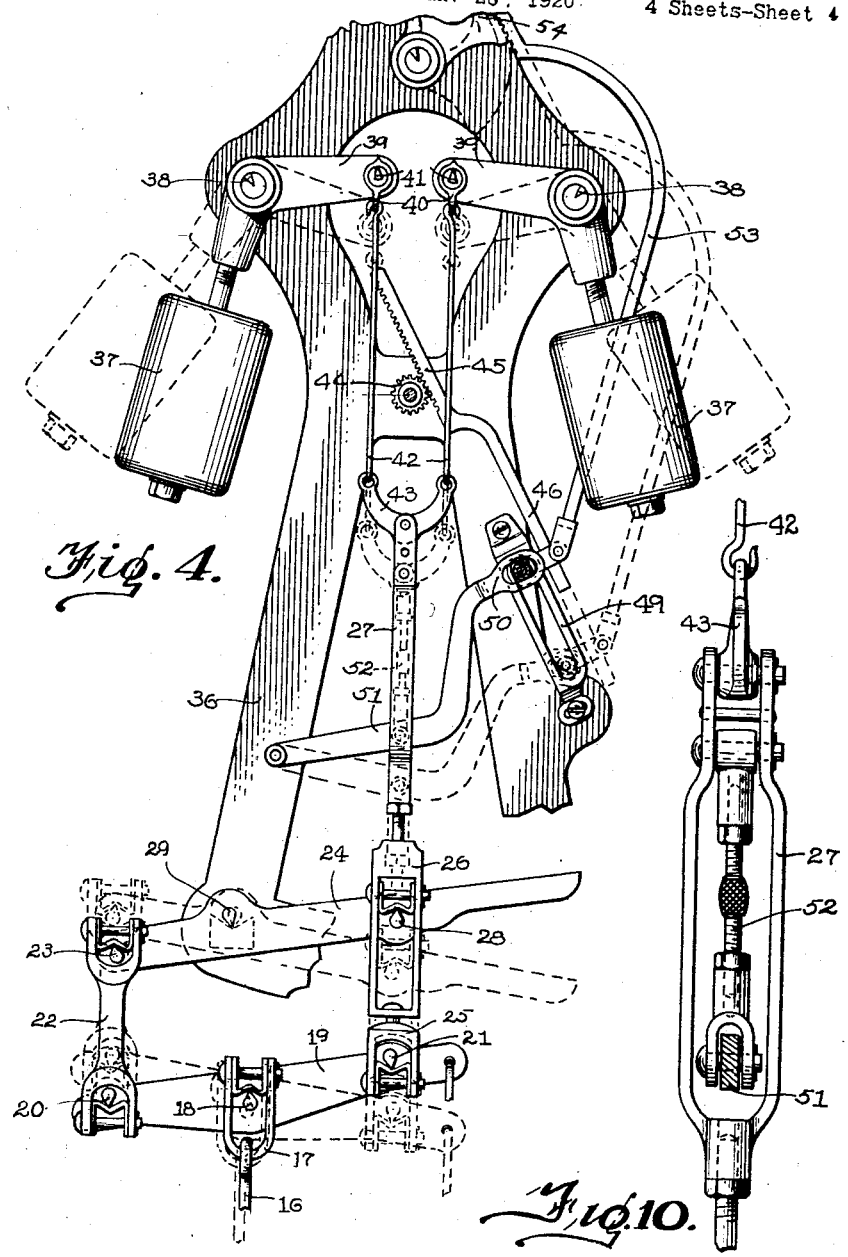
Figure 4 is a front elevation of the load-offsetting mechanism removed from the housing.
Figure 10 is a side elevation of the swinging connection between the indicator operating arm and the load-offsetting mechanism.

The frame of the scale consists principally of the base 1 housing the platform lever mechanism and an upright housing 2 supported on the base and encasing the load-offsetting mechanism, said upright housing having windows in its faces to display the fan-shaped chart 3 and the dials 4.

The platform lever mechanism is of the usual type, comprising a main lever 5 fulcrumed in swinging bearings carried by links 6, and an auxiliary lever 7 fulcrumed in bearings carried by the links 8 and connected to the lever 5 by means of the link 9. The platform 10 is supported on the levers 5 and 7 through depending brackets 11 and 12 engaging the load pivots 13 and 14 respectively. It is to be understood that all of the pivots secured to the several levers on the scale are arranged in pairs, one projecting from each side of the lever, the knife edges being in alignment.

The nose of the lever 5 is pivotally connected through a stirrup 15 to a link 16 which depends from a stirrup 17 having bearings engaging knife edge pivots 18 located intermediate the ends of a lever 19. The lever 19 is provided at each end with knife edge pivots 20 and 21, the pivots 20 being seated in bearings carried by the bifurcated lower end of a link 22 depending from knife-edge pivots 23 on the lever 24, and the pivots 21 being seated in bearings carried at the lower end of a chain of variously shaped links 25, 26 and 27, (see Fig. 4) the upper end of said chain of links being connected to the load-offsetting mechanism of the scale. The link 26 carries bearings which, in one position of the parts, engage the knife-edge pivots 28 of the lever 24.

The pivot 18 is located midway between the pivots 20 and 21 so that a force acting downwardly on the pivot 18 results in equal downwardly-acting forces on the pivots 23 and 28. The fulcrum pivot 29 of the lever 24 is not, however, located midway between the pivots 23 and 28, but is nearer the pivot 23, so that upon application of equal downwardly-acting forces to the pivots 23 and 28 the pivot 28 will move downwardly but the pivot 23 will move upwardly. If, for instance, the distances of the pivots 23 and 28 from the fulcrum pivot 29 are in the ratio of 6:8, the movement of the respective pivots 23 and 28 and the resulting movement of the pivots 20 and 21 would be in the same ratio. Since the pivot 18 is midway between the pivots 20 and 21 the movement of the pivot 18 will be half the sum of the positive or downward movement of the pivot 21 and the negative or upward movement of the pivot 20. The relative value of the movements of the pivots 20 and 21 being −6 and +8, the relative value of the movement of the pivot 18 would be $$\frac{-6+8}{2} \text{ or } 1.$$

Since the relative value of the downward movement of the pivot 21 is 8 and that of the pivot 18 is 1, the multiplication of the levers 19 and 24 is 8:1. This multiplication can obviously be varied ad infinitum by changing the relative lengths of the lever arms.

The device for changing the capacity of the scale acts by changing the multiplication of the mechanism interposed between the links 16 and 27, and is manipulated by means of a handle 30 mounted at the end of a rock shaft 31 journaled in the base 1. The rock shaft 31 carries a crank 32, the crank pin 32′ riding in a slot in the lower end of the connecting link 33 which extends upwardly into the upright housing 2. The upper end of the link 33 has a slotted head 34 which, when the link is elevated, loosely surrounds the projecting end 35 of the lever 24. In this position of the link the projecting end of the lever is out of contact with the walls of the slot so that it is free to swing about its pivot. When, however, the rock shaft 31 is given a one-quarter turn, the link is carried downwardly so that the upper end of the slot engages the projection 35 and pulls the pivot 28 downwardly out of engagement with the bearing in the link 26 and holds the lever rigidly in the position shown in Figure 5. The lever 24 when thus held against pivotal movement functions only as a bracket supporting the link 22. When the lever 24 is thus rigidly held and a pull is exerted upon the link 16, the pivot 21 will be given a movement twice that of the pivot 18. Thus, by merely giving the handle 30 one-quarter of a turn the multiplication of the mechanism between the link 16 and the link 26 is changed from 8:1 to 2:1.

The load-offsetting mechanism is carried between a pair of frame members 36 secured inside the housing 1, and consists of a pair of oppositely-swinging pendulums 37. The pendulums are each provided with the usual knife-edge fulcrum pivots 38 and with an inwardly extending arm 39. Stirrups 40 are supported upon knife-edge pivots 41, and depending from these stirrups is a pair of link rods 42, the lower ends of which are connected to an equalizer 43 which in turn is pivotally mounted in the upper end of the link 27. As above intimated, the weights of loads on the scale platform are indicated both upon a fan chart and upon dials, the fan chart being adapted for weighing light loads and the dials for weighing heavy loads. The dial indicating hands are secured on a shaft journaled in the frame members 36, which shaft carries a pinion 44 in mesh with a rack on a rack bar 45. The end 46 of the rack bar is offset and is clamped between a pair of lugs on a carriage 47 (see Figures 4 and 9). The carriage 47 is provided with a pair of rollers 48 riding in guides 49 secured to the frame members 36 and with an additional pair of rollers engaged by the slotted bifurcated ends 50 of an indicator operating arm 51 pivoted at its opposite end to the frame members 36. An adjustable link 52 has one end pivoted to the indicator operating arm 51 intermediate the ends thereof, the other end of the link 52 being pivoted to the link 27. When the link 27 is moved downwardly, the arm 51 is swung downwardly with it, thereby moving the carriage 47 and rack bar 45 downwardly and swinging the dial indicator hands to indicate the weight of the load on the platform.

An additional rack bar 53 is pivotally secured to the carriage 47 and carries a rack engaging a toothed sector 54 mounted on knife-edge pivots on the frame members 36. An index 55 is secured to the sector 54 to swing across the fan chart as the pendulums 37 swing to balance the load. The capacity of the fan chart is 10 lbs., and it is so graduated as to indicate the weight when the lever 24 is inactive and the multiplication of the lever mechanism is reduced. The capacity of the dial is 40 lbs., and it is so graduated as to indicate the weight of the load on the platform when the lever 24 is active and the multiplication of the lever mechanism is increased.

In order that it may be clearly apparent which indication represents the correct weight on the platform, I have provided a flash indicator or signal 56 visible from each side of the upright housing 2 through openings in the dial 4. The flash indicator consists of a pair of plates which are movable up and down in guides on the inner faces of the dials 4, the said plates being carried upon a strip of metal 57 secured to the head of the upper end of the link 33, the flash plates thus serving to guide the link 33 in its up and down movement. As an additional means for showing which indication represents the weight of the load on the platform, I have provided pointers 58 so mounted upon each end of the shaft 31 that when the shaft is turned to render the lever 24 inactive the pointers point to the word "Fan" on the base 1 and when the shaft is turned to render the lever 24 active the pointers point to the word "Dial" on the base 1.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a scale, in combination, a commodity-receiver, motion multiplying weighing mechanism, means for changing the multiplication of said mechanism, a plurality of independent indicators connected with said mechanism, one of said indicators indicating the load upon the commodity-receiver in each multiplication of said mechanism, means for designating the indicator upon which the load is indicated in the particular multiplication employed and means for operatively connecting said multiplication changing and said indicator designating means.

2. In a scale, in combination, a commodity-receiver, motion multiplying weighing mechanism, means for changing the multiplication of said mechanism, a fan type indicator for indicating the load on the commodity-receiver in one multiplication of said mechanism, and a dial indicator for indicating the load on the commodity-receiver in another multiplication of said mechanism.

3. In a scale, in combination, a commodity-receiver, motion multiplying weighing mechanism, means for changing the multiplication of said mechanism, a fan type indicator for indicating the load on the commodity-receiver in one multiplication of said mechanism, a dial indicator for indicating the load on the commodity-receiver in another multiplication of said mechanism, means for designating the indicator upon which the load is indicated in the particular multiplication employed and means for operatively connecting said multiplication changing and said indicator designating means.

4. In a scale, in combination, a commodity-receiver, motion multiplying automatic weighing mechanism, independent automatic indicators of different capacities connected to said mechanism, and means to change the multiplication of said weighing mechanism to cooperate with either of said indicators.

5. In a scale, in combination, weighing mechanism, means for changing the condition of sensitiveness of said weighing mechanism, a chart and chart index co-operating with said weighing mechanism in one condition of sensitiveness, and a dial and dial index co-operating with said weighing mechanism in another condition of sensitiveness.

6. In a scale, in combination, weighing mechanism, means for changing the condition of sensitiveness of said weighing mechanism, a chart and chart index co-operating with said weighing mechanism in one condition of sensitiveness, and a dial and dial index co-operating with said weighing mechanism in another condition of sensitiveness, said dial being of greater capacity than said chart.

7. In a scale, in combination, weighing mechanism, means for changing said weighing mechanism from a condition of relatively high sensitiveness to a condition of relatively low sensitiveness, a fan chart of small capacity, an index connected to said weighing mechanism and adapted to indicate the weight of a load on the scale when said weighing mechanism is in a condition of high sensitiveness, a dial of great capacity, and an index connected to said weighing mechanism and adapted to indicate the weight of a load on the scale when the weighing mechanism is in a condition of relatively low sensitiveness.

8. In a scale, in combination, weighing mechanism, means for changing the condition of sensitiveness of said weighing mechanism, independent indicators operatively connected to said weighing mechanism, one to be read in each condition of sensitiveness, a flash designating the indicator to be read and means connecting said sensitiveness changing means to said flash.

9. In a scale, in combination, weighing mechanism, means for changing the condition of sensitiveness of said weighing mechanism, a chart of small capacity, a dial of greater capacity, indices operatively connected to said weighing mechanism and co-operating respectively with said chart and said dial, a signal designating the index correctly indicating the load on the scale and means operatively connecting said sensitiveness changing means and said signal.

10. In a scale, in combination, weighing mechanism, means for changing the condition of sensitiveness of said weighing mechanism, independent indicators operatively connected to said weighing mechanism, one to be read in each condition of sensitiveness, and a flash designating the indicator to be read, said flash being connected to the means for changing the condition of sensitiveness.

11. In a scale, in combination, weighing mechanism, means for changing the condition of sensitiveness of said weighing mechanism, a chart of small capacity, a dial of greater capacity, indices operatively connected to said weighing mechanism and co-operating respectively with said chart and said dial, and a signal designating the index correctly indicating the load on the scale, said signal being connected to the means for changing the condition of sensitiveness.

12. In a scale having pendulum weighing mechanism, in combination, means for changing the sensibility reciprocal of said scale, a carriage connected to said weighing mechanism, and a plurality of indices connected to said carriage and co-operating with charts of different capacities.

13. In a scale having pendulum weighing mechanism, means for changing the sensibility reciprocal of the scale, a carriage, means connected to said weighing mechanism for moving said carriage substantially equal distances for equal increments of load, and a plurality of indices connected to said carriage and co-operating with charts of different capacities.

14. In a scale, in combination, a frame, pendulum weighing mechanism, means for changing the sensibility reciprocal of said scale, a guide on said frame, a carriage mounted to travel on said guide, means connected to said weighing mechanism for moving said carriage substantially equal distances for equal increments of load, a chart, a dial, and indices connected to said carriage and co-operating with said chart and said dial.

HALVOR O. HEM.

Witnesses:
C. O. MARSHALL,
M. C. OHL.